US008155970B2

(12) United States Patent
Anselmetti et al.

(10) Patent No.: US 8,155,970 B2
(45) Date of Patent: *Apr. 10, 2012

(54) SYSTEM AND METHOD FOR ACCESS TO MULTIMEDIA STRUCTURES

(75) Inventors: Pierpaolo Anselmetti, Turin (IT); Mauro Cociglio, Turin (IT); Simone Toniolo, Turin (IT); Diego Zanin, Turin (IT); Nadia Zerba, Turin (IT)

(73) Assignees: Telecom Italia S.p.A., Milan (IT); Loquendo S.p.A., Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/006,915

(22) Filed: Jan. 14, 2011

(65) Prior Publication Data

US 2011/0178801 A1    Jul. 21, 2011

Related U.S. Application Data

(63) Continuation of application No. 10/469,379, filed as application No. PCT/IT02/00101 on Feb. 20, 2002, now Pat. No. 7,885,815.

(30) Foreign Application Priority Data

Feb. 28, 2001  (IT) ............................... TO2001A0179
Dec. 20, 2001  (IT) ............................... TO2001A1195

(51) Int. Cl.
*G10L 11/00* (2006.01)
*G10L 13/00* (2006.01)

(52) U.S. Cl. ........................................ 704/270; 704/258
(58) Field of Classification Search .................. 704/258, 704/270; 379/88.16, 88.19
See application file for complete search history.

(56) References Cited

U.S. PATENT DOCUMENTS

| 4,785,408 A | * | 11/1988 | Britton et al. ................. 704/270 |
| 4,935,954 A | * | 6/1990 | Thompson et al. ........ 379/88.04 |
| 5,802,488 A | * | 9/1998 | Edatsune ...................... 704/231 |
| 5,953,392 A | * | 9/1999 | Rhie et al. .................. 379/88.13 |
| 6,014,427 A | * | 1/2000 | Hanson et al. ............... 379/67.1 |

(Continued)

FOREIGN PATENT DOCUMENTS

EP    0 847 179    6/1998

(Continued)

OTHER PUBLICATIONS

"XSL Transformations (XSLT), Version 1.0," W3C Recommendation Nov. 16, 1999, http://www.w3.org/TR/xslt available Oct. 13, 1999, http://web.archive.org/web/20000815054143/www.w3.org/TR/xslt.

*Primary Examiner* — Douglas Godbold
(74) *Attorney, Agent, or Firm* — Hamilton, Brook, Smith & Reynolds, P.C.

(57) ABSTRACT

A system for access to multimedia structures has telephone sets capable of connecting to a telephone network, a storage device capable of storing a plurality of multimedia structures representing messages and/or data and/or commands, and a network access server that can be associated with the telephone sets and is capable of selectively instantiating the multimedia structures via an interconnection network. There is also a voice-recognition and speech-synthesis system that can be associated with the network access server and that comprises modules for reading files in XML format and for processing the files so as to obtain files in a format that can be synthesized by a speech synthesizer.

16 Claims, 5 Drawing Sheets

U.S. PATENT DOCUMENTS

| | | | |
|---|---|---|---|
| 6,313,734 B1 * | 11/2001 | Weiss et al. | 340/7.29 |
| 6,335,964 B1 * | 1/2002 | Bowater et al. | 379/88.16 |
| 6,335,965 B1 * | 1/2002 | Katz | 379/93.12 |
| 6,466,909 B1 * | 10/2002 | Didcock | 704/260 |
| 6,512,818 B1 * | 1/2003 | Donovan et al. | 379/88.18 |
| 6,717,593 B1 * | 4/2004 | Jennings | 715/760 |
| 6,766,298 B1 * | 7/2004 | Dodrill et al. | 704/270.1 |
| 6,850,603 B1 * | 2/2005 | Eberle et al. | 379/88.16 |
| 6,904,132 B2 * | 6/2005 | Reynolds | 379/88.16 |
| 6,925,167 B2 * | 8/2005 | Suder et al. | 379/265.06 |
| 6,959,073 B2 * | 10/2005 | Reynolds | 379/88.16 |
| 6,961,776 B1 * | 11/2005 | Buckingham et al. | 709/229 |
| 7,027,568 B1 * | 4/2006 | Simpson et al. | 379/88.16 |
| 7,039,166 B1 * | 5/2006 | Peterson et al. | 379/88.18 |
| 7,043,232 B2 * | 5/2006 | Pelaez et al. | 455/412.1 |
| 7,079,629 B1 * | 7/2006 | Fellingham et al. | 379/88.16 |
| 7,123,696 B2 * | 10/2006 | Lowe | 379/88.16 |
| 7,151,822 B2 * | 12/2006 | Donovan et al. | 379/88.17 |
| 7,170,976 B1 * | 1/2007 | Keagy | 379/52 |
| 7,251,602 B2 * | 7/2007 | Ito et al. | 704/270 |
| 7,885,815 B2 * | 2/2011 | Anselmetti et al. | 704/270 |
| 2001/0032080 A1 * | 10/2001 | Fukada | 704/258 |
| 2002/0007379 A1 * | 1/2002 | Wang et al. | 707/515 |
| 2004/0225749 A1 * | 11/2004 | Pavlik et al. | 709/245 |

FOREIGN PATENT DOCUMENTS

| | | |
|---|---|---|
| EP | 1 056 267 | 11/2000 |
| GB | 2 307 619 | 5/1987 |
| WO | 00/05638 | 2/2000 |
| WO | 00/30329 | 5/2000 |
| WO | 00/51016 | 8/2000 |

* cited by examiner

SYSTEM AND METHOD FOR ACCESS TO MULTIMEDIA STRUCTURES

CROSS REFERENCE TO RELATED APPLICATIONS

This application is a continuation of U.S. patent application Ser. No. 10/469,379, filed Sep. 24, 2003, now U.S. Pat. No. 7,885,815 which is the U.S. national phase of PCT application PCT/IT02/00101, filed 20 Feb. 2002, published 6 Sep. 2002 as WO 2002/069614, and claiming the priority of Italian patent application T02001A000179 itself filed 28 Feb. 2001 and Italian patent application T02001A001195 itself filed 20 Dec. 2001, whose entire disclosures are herewith incorporated by reference.

FIELD OF THE INVENTION

The present invention relates to a system and method for access to multimedia structures and to the implementation tools for constructing the system and putting the method into practice.

More particularly, the present invention relates to a system in which an ordinary telephone set is capable of accessing an automatic answering machine service, to the corresponding access method, and to the tools whereby the system can be made to operate as an automatic answering machine.

BACKGROUND ART

Automatic systems in which an ordinary telephone set can use a telephone line to access an automatic answering machine are known in the prior art.

Prior-art systems comprise automatic answering machines which, in response to a telephone call, permit the caller to choose from a plurality of options suggested by voice prompts in order to select predetermined paths to desired services or information.

In prior-art systems, automatic answering machines comprise programs capable of interpreting voice commands or commands activated on the telephone set via appropriate keys, as well as data or data structures which generally consist of voice prompts and are usually located at the company or organization that wishes to provide alternative service choices automatically by means of access to a single telephone number.

A disadvantage shared by all answering systems, and by automatic answering machines in particular, is the fact that both the programs used to access voice prompts and the data to be accessed reside on the same answering machine.

Because of this fact, the programs are necessarily data dependent, and the data are necessarily program dependent.

Consequently, it is not possible to develop data access procedures or programs which are independent of the type of data structure to be managed.

In addition, both programs and data are linked to the physical answering machine on which they are installed, which means that it is usually necessary to modify both programs and data if the physical answering machine is changed.

Finally, because of the close link between programs and data, any change to programs or data entails corresponding changes in the respective data or programs.

These disadvantages are even more significant in the case of answering machines that operate together with voice recognition and speech synthesis systems (voice systems).

When such configurations are used in prior-art systems, in fact, generating data—which in this case consist of synthesizable voice structures—necessarily requires that programmers be available who are capable of programming, e.g. by means of a known language such as VOICE-XML, the voice structures to be synthesized.

Essentially, the inherent structural limitations of the prior-art architecture make it impossible to set up automatic answering systems in which the procedures or programs used for accessing (instantiating) are independent of the data to be instantiated and thereby permit a greater general flexibility in implementation and access.

In addition, because of the close links between programs and data and/or the difficulties in generating multimedia structures, it is not possible with prior-art methods to implement automatic answering machines simply and without the aid of personnel with programming skills or who are otherwise highly specialized.

OBJECT OF THE INVENTION

The object of the present invention is a system and method for access to multimedia data structures for automatic answering services which overcomes the limitations of prior-art methods by proposing a new architecture and method in which the data structures to be instantiated are fully independent of the programs whereby these structures can be accessed selectively.

SUMMARY OF THE INVENTION

This object is achieved by the system and method for access to multimedia structures that in accordance with the present invention make it possible to use a telephone set to selectively access automatic answering procedures available on an interconnection network such as the Internet.

In accordance with another feature of the present invention, the system and corresponding method make it possible, thanks to an innovative architecture, to manage a multiplicity of data structures to be instantiated on a single physical unit.

In accordance with yet another feature of the present invention, the system and corresponding method involve the use of a development device capable of generating the data structures to be instantiated simply and without the aid of programming personnel.

Finally, in accordance with another feature of the present invention, a particular embodiment of the system and corresponding method makes it possible to locate the procedures or programs used for access to data structures in the telephone sets.

BRIEF DESCRIPTION OF DRAWINGS

The above and other features of the present invention will be better understood from the following description of a preferred embodiment of the invention, which is intended purely by way of example and is not to be construed as limiting, taken in conjunction with the accompanying drawings, where.

BEST MODE FOR CARRYING OUT THE INVENTION

Figure 1:
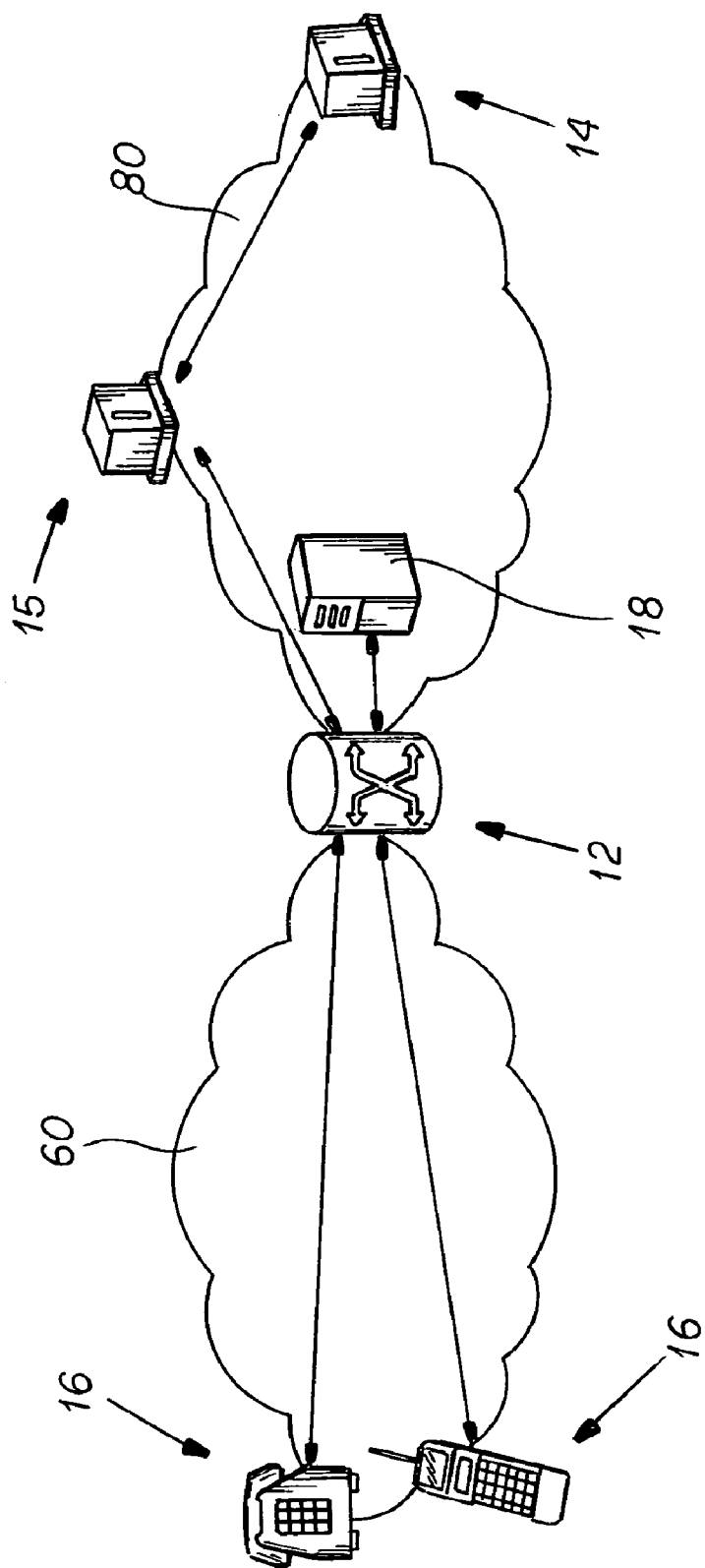
FIG. 1 is a block diagram of the system in accordance with the invention.

With reference to FIG. 1, a system 10 for access to multimedia structures consisting for example of voice structures comprises in accordance with the present invention a Network Access Server (NAS) 12, a multiplicity of telephone sets (telephones) 16 capable of connecting in accordance with the prior art to NAS 12 by means of a telephone network 60, a Domain Name Service (DNS) server 18 of known type connected to the NAS 12 by means of an Internet network 80 and capable, in accordance with the prior art of mapping logic names into Internet addresses.

Finally, the system 10 comprises a first processing apparatus (developer site) 14 connected to the Internet 80 and capable in accordance with the present invention of producing voice or multimedia answering structures as will be described in detail below, and a second processing apparatus (hosting site) 15, likewise connected to the Internet 80 and capable of storing the voice or multimedia answering structures developed by means of the developer site 14 in appropriate predetermined directories 14.

Figure 2:
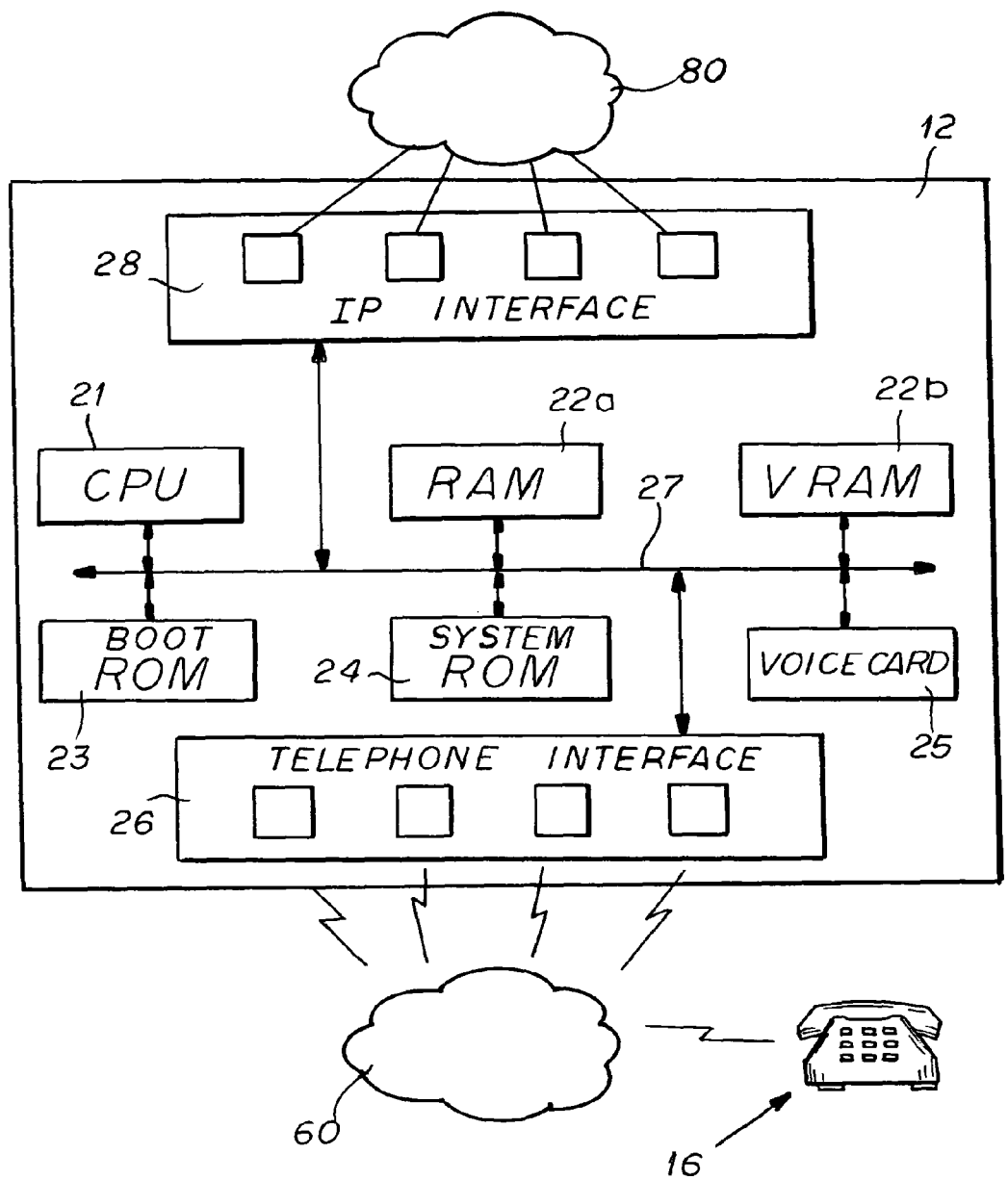
FIG. 2 is a block diagram of the access device or server shown in FIG. 1.

The NAS 12 (FIG. 1 and FIG. 2) is of known type and may for example consist of a CISCO model AS5300 NAS/Vocal Gateway comprising a central processing unit (CPU) 21, a first non-volatile memory (Boot ROM) 23 capable for example of storing boot programs to be activated at the time the NAS 12 is turned on, a second non-volatile memory (System ROM) 24 capable of storing programs developed at the time system 10 is designed, a first volatile random access memory (RAM) 22a capable for example of storing data and variables, and a second non-volatile random access memory (VRAM) 22b capable of storing configuration parameters, all of known type and mutually interconnected in accordance with the prior art by means of an internal data and command channel (BUS) 27.

In addition, the NAS 12 comprises a first interface (telephone interface) 26 capable of interconnecting the NAS 12 to a plurality of lines in the telephone network 60, and a second interface (IP interface) 28 capable of interconnecting the NAS 12 to the Internet 80, both connected in accordance with the prior art to the BUS 27.

Finally, the NAS 12 comprises a voice card 25 of known type connected to the bus 27 and capable of managing and transmitting voice messages to the telephones 16 by means of the telephone network 60 using programs resident in System ROM 24 and processed by the CPU 21.

In accordance with the present invention, the NAS 12 is capable of receiving telephone calls from the telephones 16 and of activating automatic answering machine procedures on the basis of programs developed in a known language, the Tool Command Language (TCL), for example, and stored in System ROM 24.

Figure 3:
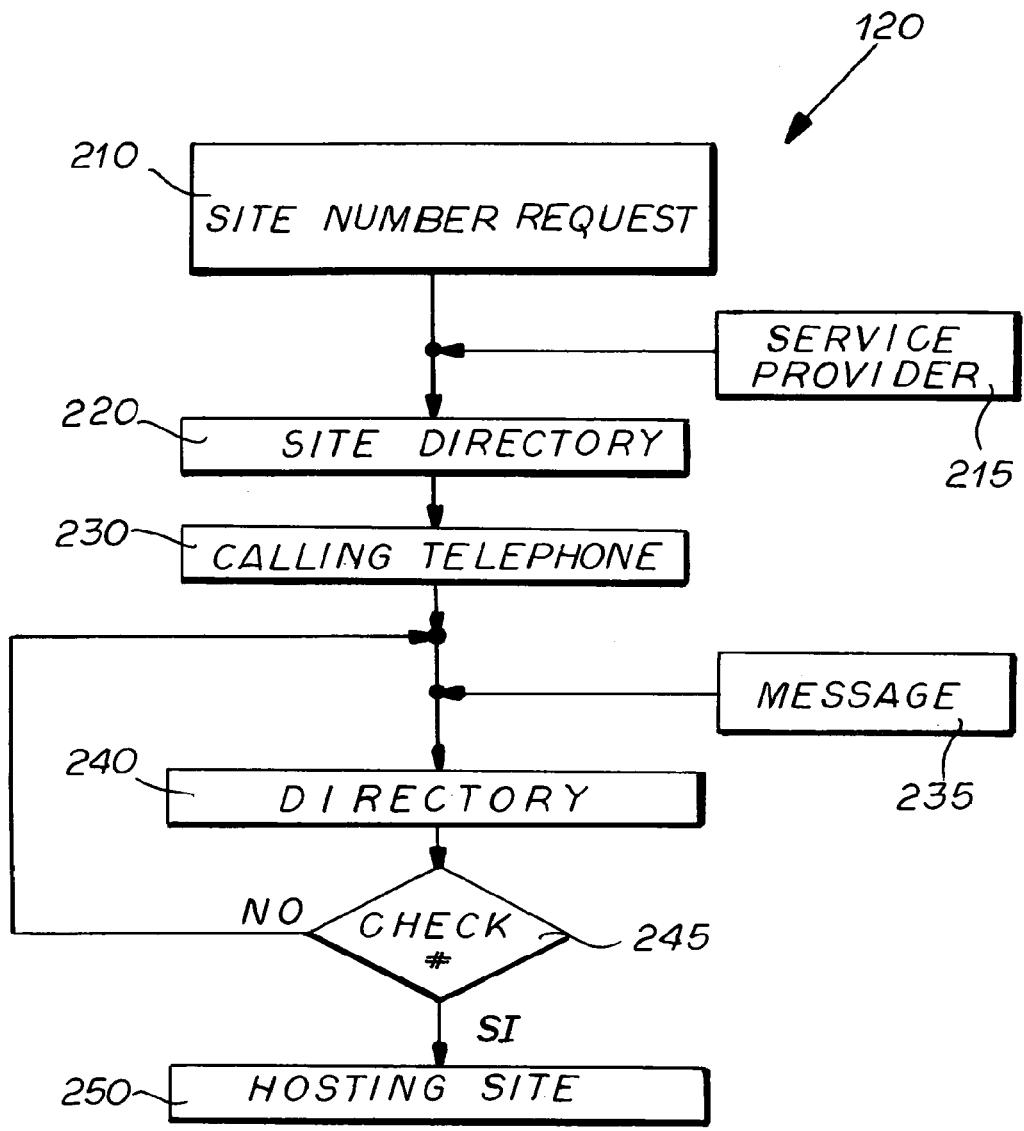
FIG. 3 is a flow chart for the call management program installed on the server shown in FIG. 2.

In particular, and in accordance with a first embodiment of the present invention, the NAS 12 is capable for example of performing automatic answering machine functions and of interpreting commands as represented in the flow chart in FIG. 3 and described below.

Upon receiving a telephone call from the telephone network 60 (FIG. 1, FIG. 2 and FIG. 3) by means of the telephone interface 26, the NAS 12 uses the program stored in system RAM 24 to download and transmit a message to the calling telephone 16 by means of the voice card 25; this message presents the service and requests the number of the site which the caller wishes to visit (step 210).

When the caller dials a predetermined number, e.g. "123456," corresponding to a particular service provider or a particular company (step 215), the NAS 12 uses appropriate look-up tables stored in System ROM 24 to map the number received into a logic name corresponding to a specific hosting site 15 and service provider directory. The NAS 12 then queries the DNS server 18 on the Internet 80 in accordance with the prior art in order to obtain the IP address corresponding to the hosting site 15, and instantiates this site and the directory (step 220).

Once the directory has been instantiated, the NAS 12 uses a file transfer protocol such as FTP (File Transfer Protocol) or an audio file streaming protocol such as RTSP (Real Time Streaming Protocol) to download the audio file or message contained in the instantiated directory via the IP interface 28. The Nas 12 then plays this audio file or message with voice card 25 so that it is transmitted to the calling telephone 16 (step 230).

As with conventional automatic answering machines, the caller receiving the message can press a key to select one of the functions envisaged by the message (step 235), whereupon the NAS 12 proceeds to instantiate a further message to be transmitted to the caller in the previously selected hosting site 15 and directory (step 240). Steps 235 and 240 are repeated cyclically until the call is completed or until the caller presses an end-of-search key, e.g. the "#" key, at which time a check is performed (step 245) and the NAS 12 completes the instantiating function for the messages recorded on the hosting site 15 (step 250).

In accordance with, another embodiment of the invention, NAS 12 is associated with a voice recognition and speech synthesis system (voice system) 121.

In this embodiment, the NAS 12 is capable of cooperating with the voice system 121 to perform the operations described for the first embodiment in equivalent fashion and by means of voice commands.

With this second embodiment, in other words, the NAS 12 is capable of cooperating with the voice system 121 in such a way that caller commands and the messages used in order to present the service, request the site that the caller wishes to visit, request further messages and to complete calls are all managed by means of voice recognition and speech synthesis.

In accordance with this second embodiment, the voice system 121 is capable of being instantiated via the NAS 12 by caller voice commands and comprises, as a further characteristic feature of the present invention, processing modules developed at the time the system 10 is designed and which are capable of selectively instantiating, as will be described in detail below, the hosting site 15 and the data structures or directories contained in it.

In particular, the voice system 121 comprises processing modules capable of reading files in XML format, of associating these files with a style sheet or XSL (eXtensible Stylesheet Language) processing module, and of processing them as will be described in detail below in such as way as to obtain files in VOICE-XML format which are capable in turn of being managed by a voice subsystem of known type.

To achieve this object, and in accordance with one of the characteristic features of this embodiment of the invention, the files in XML format (XML files) must follow certain formalisms which will be described here by means of an example of a file in which the characteristic structural elements of a navigation tree for generating a dialog between the calling user and the speech synthesis system are shown together with comments.

```
<!-XML document header -->
<?xml versidn="1.0" encoding="IS0-8859-1"?>
<!-document root -->
<treeData label="treeData" >
<!-navigation tree root node -->
<menu_node label="root">
<!-Welcome sentence -->
<welcome_audio>Welcome to the Old West restaurant voice site. Come spend an evening with
us to enjoy the very best in classic American cuisine in a truly unique setting.
</welcome_audio>
<!-subnodes reachable from the root node -->
<!--the subnode is determined by the value of the "ref" attribute-->
<link choice="Who we are" ref="0" typeref="info" />
<link choice="Where to find us" ref="1" typeref="menu" /> •
</menu_node>
<!-first tree level --> <!-info node -->
<info_node label="0" ><!-info text -->
<info_audio>Old West is a restaurant offering outstanding classic American food and excellent
service in an unforgettable Western atmosphere. Ideal for special occasions and celebrations.
</info_audio>
</info_node>
<!—first level node presenting a menu for access to the second level nodes -- > <menu_node
label="1" >
<!-node info text -->
<welcome_audio>The Old West is located in Pitigliano, just. around the corner from the
aqueduct, at Via del Moro 3.</welcome_audio>
<!--subnodes reachable from this node -->
<link ref="2" typeref="info" choice="Getting here by car" /> <link ref="3" typeref="info"
choice="Getting here by train" />
</menu_node>
<!—second tree level -->
<!—info node -->
<info_node label="2" >
<!—info text -->
<info_audio>Take the bypass, exiting at Pitigliano.</info_audio>
</info_node>
<!—info node -->
<info_node label="3" >
<!—info text -->
<info_audio>Get out at the Pitigliano station</info_audio> </info_node>
</treeData>
```

To achieve the object of the invention, moreover, the XSL processing module in accordance with one of the features of this embodiment, comprises pointers to structural elements of the XML files as well as code elements (VOICE-XML tags) that can be selectively associated with the information content of the XML files.

For greater clarity, an example of an XSL processing module is given below. This example highlights the elements of the XSL processing module which correspond to the XML file illustrated above.

```
<!—XSL document header -->
<?xml version="1.0" encoding="iso-8859-].?>
<xsl:stylesheet     version="1.0"
xmins:xs1="http://www.w3.org/1999/XSL/Transform">
<!—local parameters -->
    <xsl:param name="label"/>  •
    <xsl:param name="parentLabel"/>
    <xsl:param     name="node"
select="//link[gref=$label]/@typeref"/>
    <xsl:param     name="choice"
select="//link(Etref=$label]Pachoice"/>
    <xsl:param name="mode"I>
    <xsl:param name="id"/>
    <xsl:param name="appId"/>
<!—rules applied for the tree root node-->
<xsl:template name ="audio" match="treeDatan>
  <xsl:processing-instruction name=" cocoon-format">     type="text/xml"
  </xsl:processing-instruction>
<!—the rules applied will differ according to node type--> <xsl:choose>
    <xsl:when test="$node='info'">
            <xsl:apply-templates select="//info_nodeKtlabel=$1abel•"/>
```

-continued

```
                </xsl:when>
                <xsl:when test="$node='msg'">
                        <xsl:apply-templates select="//msg_node[@label=$labell"/>
                </xsl:when>
                    <xs1:otherwise>
                    <xsl:apply-templates
select="//menu_nodeNdabel4labelj"›
                        <xsl:with-param      name="dataId"><xs1:value-of
select="@label"/></xsl:with-param>
                    </xsl:apply-templates>
                        </xs1:otherwise>
                    </xsl:choose>
</xsl:template>
<!-rules applied for a menu type tree node-->
<xsl:template match="menu_nodeu>
<!-local parameters -->
<xsl:param name="pause">. \p300</xsl:param>
<xsl:param      name="urlFirstPage"><xs1:value-of
select='$appIds/>/<xs1:value-of
select=1$appId3/>.xml?from=site&id=vp&TApp=answer& ;appId=<xs1:value-of
select='$appId'/>&OCSLPath=mainVXML.xsl&label=root&
;mode=audio</xs1:param>
<! - output VXML code -->
<vxml        version="1.0"
application-"http://localhost/Answer/answer_root.vxmlu>
<form>
<block>
<!-the welcome part is extracted from the XML file--> <xsl:value-of select="welcome_audio"/>.
</block>
<field name="answeru>
<prompt bargain="trueu>You can choose between:<enumerated/></prompt>
<grammar    type="application/x-jsgf-fix">repeat_back_start
over</grammar>
<!-the correct vxmm code is generated for each link --> <xsl:for-each select=ulinkfl>
<xsl:param       name="url"><xs1:value-of
select='$appId'/>/<xs1:value-of
select='$appId1/>.xml?from=site&id=vp&TApp=answer& ;appId=<xs1:value-of
select=1$appId1/>&XSLPath=mainVXML.xsl&label=<xs1:val ue-of
        select="@ref"/>&mode=audio&node=<xs1:value-of
        select="@typeref"/>&parentLabel=<xs1:value-of
select="$label"/></xs1:param>
<xs1:element-name="option"›
        <xsi:att.ribute        name="value"><xs1:value-of
select="Sur1"/></xs1:attribute>
                <xsl:value-of select="@choice"/>
                <xsl:value-of select="$pausa"/>
            </xs1:element>
    </xsl:for-each>
<!-output VXML code -->
        <filled>
            <if cond="answer.search(IXSLPath=1) != -1">
                <goto expr="XSL_URL+answer"/>
            <elseif cond="answer == 'repeat'"/>
                <clear/> <reprompt/>
            <elseif cond="answer == 'start over'"/>
            <goto expr="application.ROOT_PAGE"/>
            </if>
        </filled>
        </field>
        <catch event="noinput"›
            <prompt>Remember that you can always say: "back" to_ return to the previous
page, or: "start over," to return to the portal home page.</prompt>
            <clear namelist="answer/>
                <reprompt/>
            </catch>
            <catch event="nomatch"›
                <prompt>I don't understand.</prompt>
                <clear namelist="answer"/>
                    <reprompt/>
                </catch>
            </form>
                </vxml>
            </xsl:template>
<!—rules applied for an information leaf type tree node--> <xs1:template matCh="info_noden>
<!—the info text is extracted from the XML file-->
        <xsl:param        name="urlFirstPage"><xs1;value-of
        select='$appId'/>/<xs1:value-of
select='$appId1/>.xml?from=site&id=vp&TApp=answer& ;appId=<xs1:value-of
select='$appId'/>&XSLPath=mainVXML.xsl&label=root&
;mode=audio</xs1:param>
```

```
<!--output VXML code-->
        <vxml version="1.0"
application="http://localhost/Answer/answer_root.vxmig>
        <form>
            <field name="answer">
            <prompt     bargein="true"><xsl:value-of
select="info_audio"/>. \p300 Now you can choose between: repeat and start over.</prompt>
            <grammar    type="application/x-jsgf-flx">repeatistart
over</grammar>
            <filled>.
                <if cond="answer == 'repeat'">
                <clear namelist="answer"/>
                    <reprompt/>
                <elseif cond="answer == 'start over'"/>
                    <goto expr="application.ROOT_PAGE"/>
                </if>
            </filled>
            </field>
            <catch event="noinput">
            <prompt>Please    choose one  of  the  suggested
options.</prompt>
            <clear namelist="answer"/>
                    <reprompt/>
            </catch>
            <catch event="nomatch">
                <prompt>I don't understand.</prompt>
                <clear namelist="answer"/>
                    <reprompt/>
            </catch>
        </form>
</vxml>
</xsl:template>
</xsl:stylesheet>
```

Finally, to achieve the object of the invention, the XML files and the XSL processing module, which are constructed according to the formalisms or rules indicated above, are processed dynamically, for example by using a parser module of known type such as the "COCOON" module available free of charge on the Internet, in order to selectively map the XML files into the XSL processing module and thus automatically generate files in VOICE-XML format.

An example of this type of file is given below. As will be readily apparent to a person skilled in the art, this example shows the mapping of an XML file with the XSL processing module.

```
<?xml version="1.0" encoding="IS0-8859-1"?>
<vxml application="http://localhost/Answer/answer_root.vxml" version="1.0">
<form>
    <block>Welcome to the Old west restaurant voice site_ Come spend an evening with•us to
enjoy the very best in classic American cuisine in a truly unique setting. </block>
    <field name="answer">
        <prompt     bargein="true">You can  choose
between:<enumerated/></prompt>
        <grammar    type="application/x-jsgf-flx">repeat_ start    over</grammar>
        <option
value="0004/0004.xml?from=site&id=vp&TApp=answer&
appId=0004&XSLPath=mainVXML.xsl&label=0&mode=audi
o&node=info&parentLabel=root">Who we   are.
\p300</option>
        <option
value="0004/0004.xma?from=site&id=vp&TApp=answer&amP;
appId=0004&XSLPath=mainVXML.xsl&label=l&mode=audi
o&node=menu&parentLabel=root">Where to find us \p300</option>
        <filled>
        <If cond="answer.search(   'XSLPath=  ') != -1">    <goto
expr="XSL_URL+answer"/>
        <elseif cond="answer == 'repeat'"1>
            <clear/>
            <reprompt/>
        <elseif cond="answer == 'start over'"/>
            <goto expr="application.ROOT_PAGE"I>
        </if>
        </filled>
```

-continued

```
    </field>
    <catch event="noinput">
        <prompt>RemeMber that you can always say: "start over" to return to
the   'portal home page.</prompt>        <clear namelist="answer"/>
        <reprompt/>
    </catch>
    <catch event="nomatch">
        <prompt>I don't understand.</prompt>
        <clear namelist="risposta."/><reprompt/>
    </catch>
</form>
</vxml>
```

In accordance with this second embodiment of the invention, the NAS 12 associated with the voice system 12 is capable, thanks to this set of modules, of instantiating data structures representing messages to be synthesized, and of making them available dynamically to a voice subsystem of known type.

The developer site 14, which is a further characteristic feature of the present invention, may for example consist of a personal computer or PC with Windows 95 operating system and comprising a 100 MHz Pentium microprocessor, 64 Mbyte RAM, a 1 Gbyte hard disc drive, a color monitor and at least one port for connection to the Internet.

By means of modules or programs developed in a PC programming language of known type such as Visual BASIC or Java, the developer site 14 makes it possible to produce voice or multimedia data structures (data structures) to be stored in memory on the hosting site 15. In accordance with the described embodiments of the invention, the data structures consist, for example, of voice prompts that can be managed directly by the NAS 12 and/or of files in XML format that can. be managed by the voice system 121 associated with the NAS 12.

In general, the developer site 14 is capable in accordance with the present invention of implementing the functions used to construct and test a multimedia data structure following predetermined formalisms.

Figure 4:
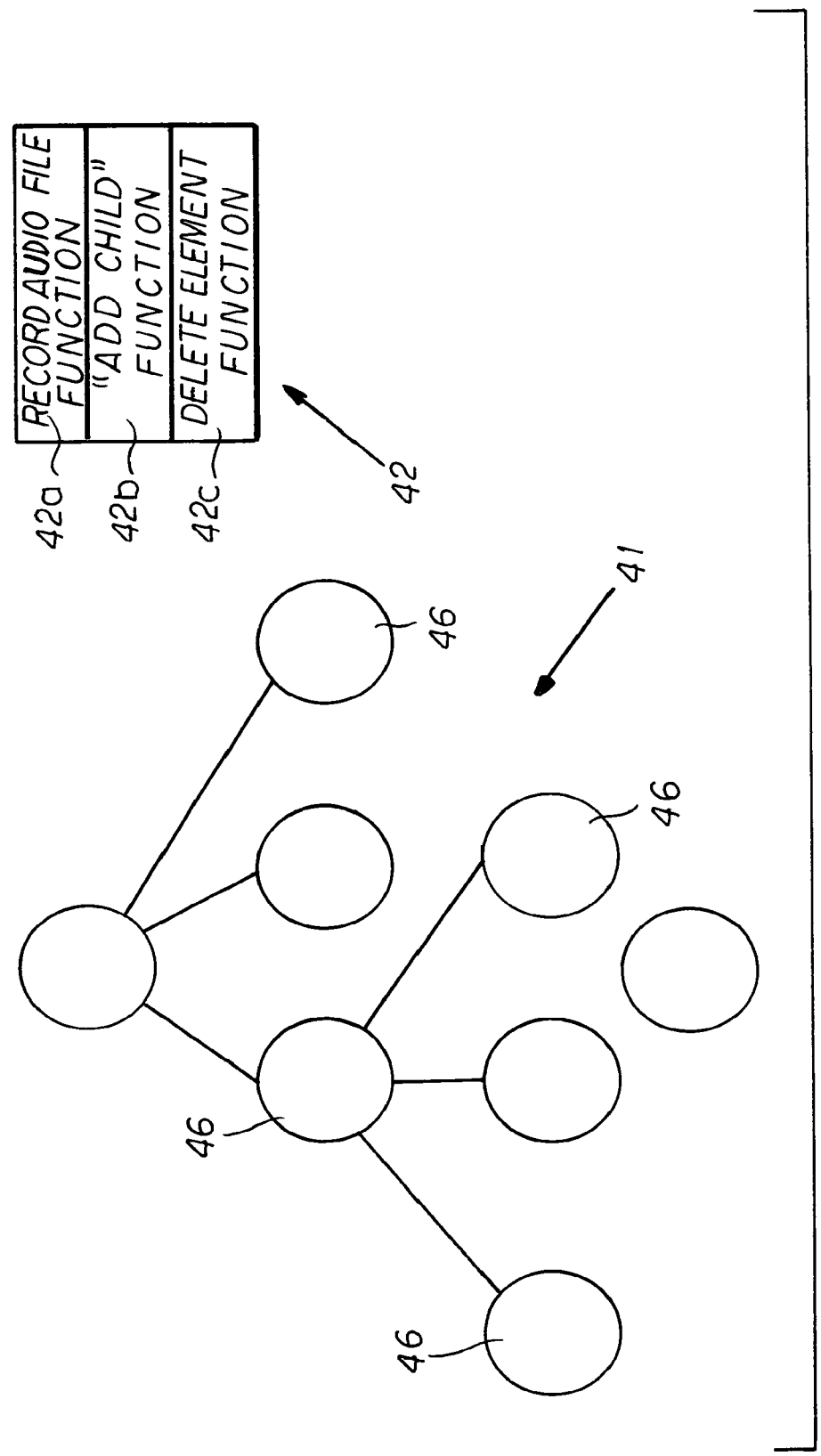
FIG. 4 is an example of a model for data structure generation in accordance with the invention.

When a data structure is to be constructed, for example, the developer site 14 can use programs developed at the time the system 10 is designed and implemented on the developer site 14 itself or on the hosting site 15 whereby it is capable of presenting a tree diagram 41 (FIG. 1 and FIG. 4) with multiple elements 46 representing a data structure and a table of predetermined functions (function table) 42 on the monitor, e.g. in graphic form and in response to appropriate initialization commands.

The elements 46 of the tree diagram 41 represent, for example, voice or multimedia messages, while the function table 42 shows the alternative operations that are possible in the displayed context; these operations may for example include a "record audio file" function 42a, an "add child" function 42b and a "delete element" function 42c, whose characteristics will be readily apparent to a person skilled in the art.

Constructing a data structure consists, for example, of the following functions:

Assigning a name to the data structure, e.g. "goofyi"; Selecting an element 46 from the tree diagram 41; Assigning a name to the element 46;—Assigning a voice or multimedia file to the element 46; and Storing the data structure corresponding to the tree diagram thus constructed, either locally on the developer site 14 or remotely on the hosting site 15, depending on the type of modules developed at the time system 10 was designed.

Naturally, if a data structure that can be synthesized by the voice system 121 is to be constructed, the data structure must as will be readily apparent to a person skilled in the art be constructed in such a way as to comply with the formalisms described above in this connection, thus ensuring that the structure can be managed automatically by the parser in order to generate VOICE-XML files dynamically.

Figure 5:
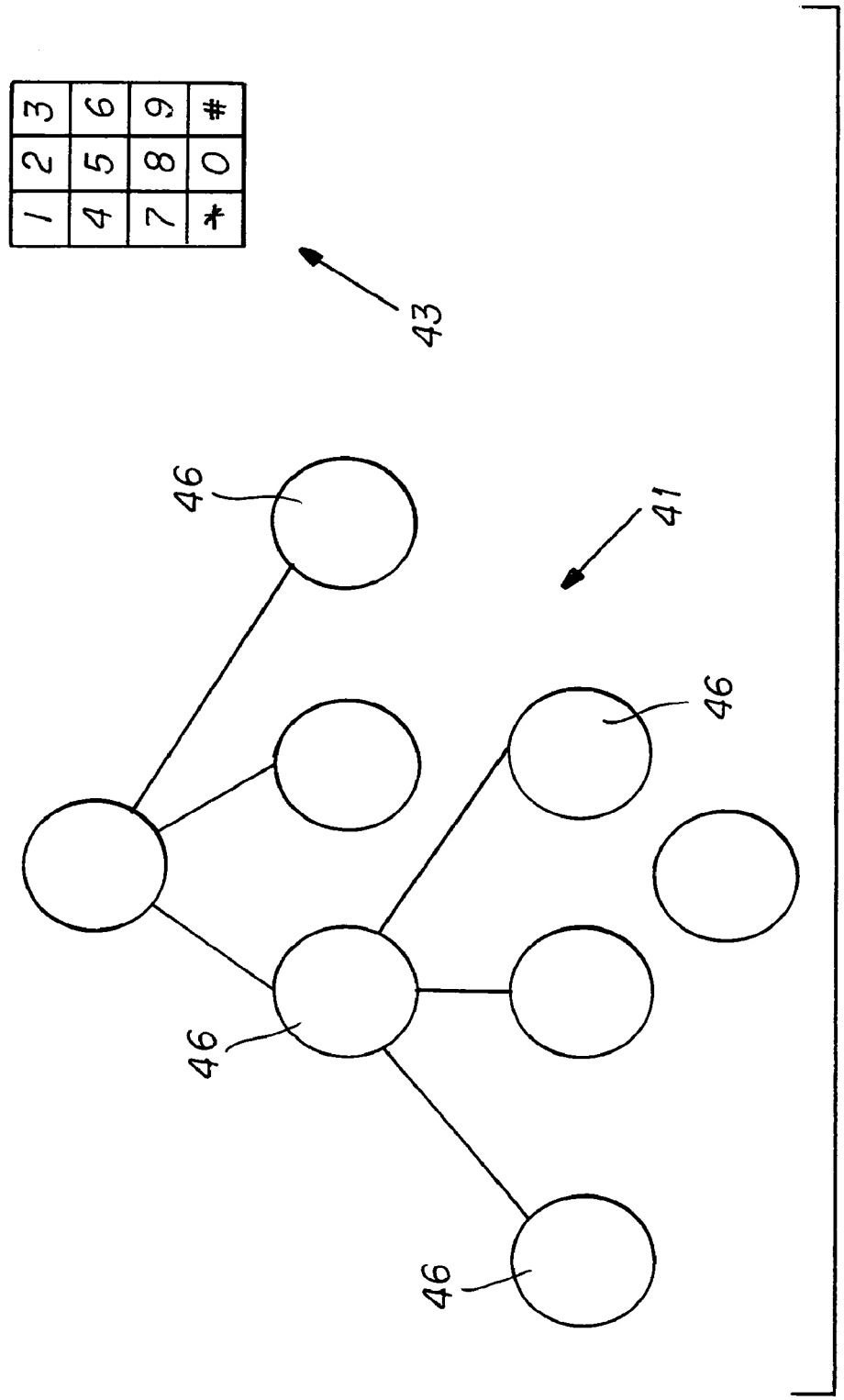
FIG. 5 is an example of a model for data structure testing in accordance with the invention.

When a data structure is to be tested, for example, the tree diagram 41 (FIG. 1, FIG. 2 and FIG. 5) representing the data structure to be tested is displayed and, in accordance with the embodiments described, a table (virtual keypad) 43 is also displayed which has selectable elements corresponding for example to the keys on a telephone keypad or, equivalently, to functions for "playing" or viewing the contents of each individual element 46 in the tree diagram 41.

In the first embodiment described, testing consists specifically of the following functions:

Selecting a particular data structure, e.g. the structure named "goofyl," in order to view the corresponding tree diagram 41;

Selecting a key on the virtual keypad 43 in order to play the corresponding recorded message;

Checking that there is a perfect match between the keys on the virtual keypad 43 and the elements 46 of the tree diagram 41; and Storing the data structure on the hosting site 15 after the test.

Likewise, in the second embodiment described, in which the NAS 12 is associated with the voice system 121, testing may for example consist of the following functions:

Selecting a particular data structure, e.g. the structure named "goofyl," in order to view the corresponding tree diagram 41;

Selecting the "play" function on the chosen node in the tree diagram in order to play the corresponding recorded message; or, alternatively, Selecting the function whereby the contents of each individual element can be viewed, e.g. in an HTML type format; and Editing the element stored on the hosting site 15 if necessary.

The hosting site 15, which is a further characteristic feature of the present invention, may for example consist of a SUN Ultra5 WS with Sparc-II processor and 512 Mbyte RAM, and has capabilities corresponding to those of a station hosting Internet sites.

In accordance with the present invention, the hosting site 15 is capable of storing a plurality of data structures and of making these structures selectively available on the Internet, e.g. by means of access on the part of the NAS 12 or, equivalently, on the part of the NAS 12 associated with the voice system 121.

Consequently, the system 10 thus described has an architecture in which the apparatus capable of accessing or instantiating the data structures, e.g. the NAS 12, is strictly separate from the apparatus that stores the data structures to be instantiated, e.g. the hosting site 15, and in which the apparatus used to create and test the automatic answering machine function, e.g. the developer site 14, consists essentially in an apparatus for creating and testing a particular data structure which can be readily located on the premises of the organization which intends to generate and activate an automatic answering machine.

In accordance with the first embodiment of the invention, operation of the system 10 described above is as follows.

Upon receiving a call from a user of a telephone number corresponding to one of the telephone lines accessing the NAS 12, the latter uses the program stored in System ROM 24 to activate a predetermined voice prompt which directs the user to dial a number corresponding to a particular service provider or answering machine.

When the user dials the number corresponding to the specific desired service, the NAS 12, with the aid of the DNS server 18, maps the dialed number into an IP address and a data structure name, e.g. in the known form "ftp://131.1.15.127/123456" or "rtsp://131.1.15.127/123456" in order to uniquely instantiate the hosting site 15 and the data structure desired by the user.

In addition, the NAS 12 reads the first file on the hosting site 15, e.g. the "0" file of the instantiated structure, decodes it with the voice card 25 and transmits the decoded voice prompt to the telephone 16 of the calling user so that the latter can proceed in successive steps based on the options provided by the voice prompt to instantiate, for example by pressing individual keys, the further prompts and messages along the instantiated tree diagram 41 set up by the service provider using the developer site 14.

In accordance with the present invention, it is also envisaged that the NAS 12 will comprise the following conventional functions:

Retaining a record of all keys pressed by the user in memory so that the requested file or prompt can be uniquely identified. For example, if the user listens to the initial file and then presses 1, the file stored in the hosting site 15 under the name "1" will be played, and if the user listens to this file and then dials 3., file "13" will be played, and so on; Enabling certain predetermined keys on the telephone, e.g. three special keys such as the "0," "*" and "#" keys, to perform predetermined functions; thus, for example, "0" key can be used to listen to the last file again, the "*" key can be used to move up by one level on the tree diagram 41, and the "#" key can be used to listen to the final file (if such exists) and then exit from automatic answering machine functions. To extend the example given above, if the user listens to file "13" and then presses the "0" key on telephone 16, file "13" in tree diagram 41 will be played again, while if the user presses the "*" key, file "1" will be played, and if the user presses the "#" key, the file named "end" will be played;

Enabling rapid access to a particular element in the data structure by allowing the user to instantiate a file by means of a group of keys (bookmark) which indicates a specific path.

For the second embodiment of the invention, in which the NAS 12 is associated with the voice system 121, operation is substantially equivalent to that described above, the only difference being that in this second embodiment the user's commands can also be voice commands and the resulting prompts may be produced through synthesis from the contents of the dynamically generated VOICE-XML format files.

In particular, key actuation as described above may be replaced by voice commands and the resulting prompts may be produced through synthesis of XML format files taken dynamically from the hosting site 15 by the voice system 121 and converted into VOICE-XML format.

From the standpoint of the user, the system 10 in accordance with the present invention thus presents features equivalent to those of a known automatic answering system, while as regards the "structure" and the "method" whereby its functions are implemented, the system 10 has features that are entirely novel with respect to prior-art automatic answering systems.

In describing the present invention, reference has been made to the fact that the telephones must connect to a NAS in order to access the Internet.

In reality, the telephones used in mobile voice and data telephone networks such as UMTS (Universal Mobile Telecommunications System) are capable of accessing the Internet directly; consequently, in such contexts and in accordance with another possible variant which will be readily apparent to a person skilled in the art, the programs and procedures described as resident on the NAS can also be implemented directly on internal devices in these telephones so that the instantiation function can be assigned to the telephone itself, even though the location of the data structures remains unchanged.

In accordance with a further variant of the present invention, it will be readily apparent to a person skilled in the art that, inasmuch as the system as described manages data structures consisting of voice prompts, e.g. recorded or synthesizable messages, nothing prevents the elements of the data structures from consisting of multimedia messages which may for example include voice and images.

In accordance with yet another possible variant of the present invention, it will likewise be readily apparent to a person skilled in the art that the elements of the data structures can contain IP addresses/directories or telephone numbers which, once transferred to the telephone or the NAS, make it possible for example to instantiate further hosting sites/data structures or to activate telephone calls via the Internet.

Naturally, the elements of the data structure can also consist of command files arranged in such a way that, once they are transferred to the telephone or the NAS, the user can press keys in order to enter string of numbers and make use of interactive services such as e-commerce or which involve filling out questionnaires.

The components, circuit elements and connections as. contemplated in the foregoing description are capable of modifications in various obvious respects, as are the details of the circuitry and construction as illustrated and of the operating method, all without departing from the scope of the invention as specified in the appended claims.

What is claimed is:

1. An apparatus comprising:
a processor; and
memory storing at least one program that, when executed by the processor, causes the apparatus to:
instantiate multimedia structures in a directory, the multimedia structures comprising at least one of messages, data, and commands;
download the multimedia structures contained in the directory; and
instantiate a voice-recognition and speech-synthesis system that comprises modules for reading files in XML format, for associating the files with an XSL processing module, and for mapping the XML files into the XSL processing module to obtain files in a format that is configured to be interpreted by the voice-recognition and speech-synthesis system.

2. The apparatus defined in claim 1, wherein the apparatus is configured to connect to at least one telephone set via a telephone network.

3. The apparatus defined in claim 1, wherein the multimedia structures comprise at least one voice prompt to provide options for accessing the at least one of messages, data and commands in the multimedia structures.

4. The apparatus defined in claim 1, wherein the apparatus further comprises a speech synthesis module configured to synthesize prompts and messages.

5. The apparatus defined in claim 4, wherein the multimedia structures comprise messages that are configured to be interpreted by the speech synthesis module and provide options for accessing the at least one of messages, data and commands in the multimedia structures.

6. The apparatus defined in claim 1, wherein the at least one program, when executed by the processor, causes the apparatus to:
    instantiate the multimedia structures via an interconnection network comprising the internet.

7. The apparatus defined in claim 1, wherein the multimedia structures comprise at least one element having an address for instantiating further devices configured to store multimedia structures.

8. The apparatus defined in claim 1, wherein the multimedia structures comprise at least one element having a telephone number for activating telephone calls with at least one telephone set via an interconnection network.

9. The apparatus defined in claim 1, wherein the multimedia structures comprise at least one element having a set of commands that are configured to be activated by at least one telephone set in order to conduct e-commerce or respond to questionnaires.

10. The apparatus defined in claim 1, wherein the at least one program, when executed by the processor, causes the apparatus to:
    identify a network address of a remote hosting site in a look-up table based on a received number specific to the remote hosting site; and
    instantiate, using the identified network address, a service provider directory at the remote hosting site in which the multimedia structures are stored.

11. A method comprising:
    instantiating multimedia structures in a directory through an interconnection network by determining a network address of a remote hosting site in which a device configured to store the multimedia structures is located using a received number, wherein the multimedia structures comprise at least one of messages, data, and commands;
    downloading the multimedia structures contained in the directory; and
    instantiating, at a server, a voice-recognition and speech-synthesis system that reads files in XML format, associates the read XML files with an XSL processing module, and maps the XML files into the XSL processing module.

12. The method defined in claim 11, further comprising:
    receiving an indication that at least one key on a telephone set is actuated; and
    instantiating at least one element of the multimedia structures through the server responsive to the indication.

13. The method defined in claim 11, further comprising:
    receiving an indication that a voice message is sent through a telephone set; and
    instantiating at least one element of the multimedia structures through the server responsive to the indication.

14. The method defined in claim 11, further comprising:
    receiving from a telephone set an indication that a call is complete; and
    responsive to receiving the indication that the call is complete, terminating the instantiation of the multimedia structures at the server.

15. The method of claim 11, further comprising:
    identifying a network address of a remote hosting site in a look-up table based on a received number specific to the remote hosting site; and
    instantiating, using the identified network address, a service provider directory at the remote hosting site in which the multimedia structures are stored.

16. The method of claim 15, further comprising:
    identifying the service provider directory in the look-up table based on the received number.

\* \* \* \* \*